(12) United States Patent
Sharma et al.

(10) Patent No.: US 12,095,736 B2
(45) Date of Patent: Sep. 17, 2024

(54) SECURITY ASSOCIATION BUNDLING FOR AN INTERFACE

(71) Applicant: VMware LLC, Palo Alto, CA (US)

(72) Inventors: Awan Kumar Sharma, Pune (IN); Yong Wang, Palo Alto, CA (US); Sourabh Bhattacharya, Pune (IN); Bhargav Puvvada, Pune (IN); Sarthak Ray, Pune (IN); Mayur Katke, Pune (IN)

(73) Assignee: VMware LLC, Palo Alto, CA (US)

( * ) Notice: Subject to any disclaimer, the term of this patent is extended or adjusted under 35 U.S.C. 154(b) by 697 days.

(21) Appl. No.: 17/213,321

(22) Filed: Mar. 26, 2021

(65) Prior Publication Data
US 2022/0231993 A1 Jul. 21, 2022

(30) Foreign Application Priority Data

Jan. 21, 2021 (IN) .............................. 202141002959

(51) Int. Cl.
H04L 9/40 (2022.01)
H04L 45/00 (2022.01)
H04L 45/586 (2022.01)

(52) U.S. Cl.
CPC .......... H04L 63/0272 (2013.01); H04L 45/38 (2013.01); H04L 45/586 (2013.01); H04L 63/029 (2013.01); H04L 63/0485 (2013.01)

(58) Field of Classification Search
CPC ............... H04L 63/0272; H04L 63/029; H04L 63/0485; H04L 45/38; H04L 45/586
See application file for complete search history.

(56) References Cited

U.S. PATENT DOCUMENTS

| 7,117,526 | B1 * | 10/2006 | Short | H04L 63/0272 |
| | | | | 713/168 |
| 7,984,495 | B1 * | 7/2011 | Aravind | H04L 12/4641 |
| | | | | 726/15 |
| 9,832,175 | B2 * | 11/2017 | Chen | H04L 63/0272 |
| 10,257,167 | B1 * | 4/2019 | Matthews | H04L 12/4641 |

(Continued)

OTHER PUBLICATIONS

Chandrashekar, Shekhar et al., U.S. Appl. No. 16/906,905, filed Jun. 19, 2020.

(Continued)

Primary Examiner — Linglan Edwards
(74) Attorney, Agent, or Firm — King Intellectual Asset Management

(57) ABSTRACT

A method for IPSec communication between a source machine and a destination machine is provided. The method includes receiving, at the destination machine, first and second packets from the source machine through first and second VPN tunnels established between a first VTI of the source machine and a second VTI of the destination machine; determining the first packet corresponds to a first SA and the second packet corresponds to a second SA; processing, by a first processing core, the first packet based on the first SA, and processing, by a second processing core, the second packet based on the second SA; and updating, at the second VTI, states of one or more flows based on the first and second packets, the second VTI providing one or more stateful services for the one or more packet flows based on the one or more states.

20 Claims, 6 Drawing Sheets

(56) References Cited

U.S. PATENT DOCUMENTS

| | | | |
|---|---|---|---|
| 10,498,708 B2 | 12/2019 | Wang et al. | |
| 10,601,779 B1* | 3/2020 | Matthews | H04L 67/141 |
| 10,623,372 B2 | 4/2020 | Wang et al. | |
| 10,701,107 B2 | 6/2020 | Gopal et al. | |
| 11,503,004 B2* | 11/2022 | Xiong | H04L 63/0272 |
| 2017/0126626 A1* | 5/2017 | Datta | H04L 63/0272 |
| 2019/0173850 A1 | 6/2019 | Jain et al. | |
| 2019/0173851 A1* | 6/2019 | Jain | H04L 63/0485 |
| 2019/0372936 A1* | 12/2019 | Sullenberger | H04L 63/164 |
| 2022/0060370 A1* | 2/2022 | Gage | H04L 45/24 |

OTHER PUBLICATIONS

Kumar, Raju et al., U.S. Appl. No. 16/016,360, filed Jun. 22, 2018.
Wang, Dexiang et al., U.S. Appl. No. 16/893,450, filed Jun. 5, 2020.
Wang, Yong et al., U.S. Appl. No. 16/514,647, filed Jul. 17, 2019.
Wang, Yong et al., U.S. Appl. No. 16/802,580, filed Feb. 27, 2020.
Yu, Jia et al., U.S. Appl. No. 16/450,026, filed Jun. 24, 2019.
U.S. Appl. No. 18/088,555, filed Dec. 24, 2022.

\* cited by examiner

SECURITY ASSOCIATION BUNDLING FOR AN INTERFACE

RELATED APPLICATIONS

Benefit is claimed under 35 U.S.C. 119(a)-(d) to Foreign Application Serial No. 202141002959 filed in India entitled "SECURITY ASSOCIATION BUNDLING FOR AN INTERFACE", on Jan. 21, 2021, by VMware, Inc., which is herein incorporated in its entirety by reference for all purposes.

BACKGROUND

A datacenter comprises a plurality of physical machines in communication over a physical network infrastructure. In certain cases, a physical host machine includes one or more virtualized endpoints, such as virtual machines (VMs), containers, or other types of virtual computing instances (VCIs). Applications of a tenant (or client) of a data center may execute in the VMs or other types of VCIs and communicate with each other over one or more networks in the datacenter. An application may also communicate with other applications, or other parts of the same application, that reside in other remote sites (e.g., in different geographic locations). For example, an application running in a private on-premise datacenter may need to access a corporate intranet resource which is running on a server located behind a firewall of the on-premise datacenter in a different physical network. As another example, in a multi-tier application, one tier of the application executing in a VCI of one datacenter may establish a direct communication with another tier of the application that executes in a VCI of another datacenter.

The endpoints, whether physical machines or VCIs, on which different applications, or different portions of the same application, execute may communicate, in part, over a secure network, such as a virtual private network (VPN) in order to protect data that is exchanged between the endpoints. A secure Internet protocol, such as IPSec is widely used to encrypt and thus protect communications, such as between datacenters, or within datacenters, from eavesdropping, man-in-the-middle attacks, or other malicious intervention. For example, endpoints in a first datacenter may communicate with endpoints in a second datacenter via a gateway of the first datacenter and a gateway of a second datacenter. The gateways implement the secure tunnel over which traffic is sent for the endpoints and may additionally provide other edge services like firewalls, network address translation (NAT), etc.

Packets sent from a particular source endpoint to a particular destination endpoint that share common properties may be considered a flow, which is uni-directional. In particular, a flow may be defined as a set of packets having the same 5-tuple, meaning the same source IP address, destination IP address, source port number, destination port number, and protocol number. Accordingly, there may be multiple flows between endpoints in the first and second datacenters that are communicated via the gateways. A flow is defined at a packet level. In contrast, a session, such as a TCP session, is defined at the transport layer. A session may refer to the bi-directional set of flows between two endpoints where the source and destination addresses of the 5-tuple are reversed.

A pair of gateways may establish a VPN tunnel, which is an encrypted link, between the gateways using a secure protocol such as IPsec. As part of the negotiation of the VPN tunnel, the gateways may negotiate security associations (SAs), one for each direction of the VPN tunnel, to use for communication over the VPN tunnel between the gateways. Thus, each SA may correspond to a one-way or simplex connection. The SAs are a form of contract between the gateways detailing how to exchange and protect information among each other, including indicating how to encrypt/decrypt data. Each SA may include a mutually agreed-upon key, one or more secure protocols, and a security parameter index (SPI) value identifying the SA, among other data. After the SAs have been established between a pair of gateways, the secure protocol may be used to protect the data exchanged between the gateways, for example, by encrypting/decrypting the data according to the SAs, thereby establishing secure communication over the VPN tunnel. For example, any flows communicated from endpoints in the first datacenter to endpoints in the second datacenter may be encrypted at the first datacenter using an SA and sent over the VPN tunnel.

In datacenters, gateways sitting at the edge of the networks may support policy-based VPNs, and/or route-based VPNs. A policy-based VPN relies on a policy defined by, for example, a system administrator. In the policy-based VPN, the VPN configuration may be changed only if the policy is changed, e.g., by manual intervention by a systems or network administrator. As such, the policy-based VPN may be difficult to dynamically modify and/or scale up. In contrast, a route-based VPN uses routing to decide which traffic (e.g., packets, flows, etc.) needs to be protected. Route-based VPNs are often popular because of the ease in management of the VPN. For example, once a VPN is setup, routes are learnt dynamically without additional administrative intervention. Since the route-based VPN supports dynamic routing protocols, it allows dynamic modification of the definitions of the protected traffic, and thus provides scalability. Other benefits of a route-based VPN, compared to a policy-based VPN, include the ability to dynamically modify the definitions of the protected traffic without a need to reconfigure the VPN, and/or support for high availability via routing.

Despite the above-described benefits, a route-based VPN can have shortcomings. For example, conventional route-based VPNs suffer from performance issues, such as limited throughput, in particular at the destination gateway that receives packets from a source gateway. A packet sent by a source gateway may be referred to as an outgoing or egress packet of the source gateway. A packet received by a destination gateway may be referred to as an incoming or ingress packet of the destination gateway. A source gateway that transmits outgoing packets corresponding to one or more flows on a VPN tunnel typically uses one SA for the one VPN tunnel to encrypt the packets. When the packets are received at the destination gateway, a single CPU (or core) of the destination gateway is used to process all of the packets, even though the destination gateway includes a plurality of CPUs. In particular, the destination gateway may use one or more load-balancing algorithms that use hashes of packet header information to assign packets to queues processed by different CPUs. For example, the destination gateway may generate a hash of a tuple of values in a header of the packet, such as including source/destination IP address, source/destination port number, and SPI value associated with the SA. Since all packets received over a particular VPN tunnel have identical header values, the hash will correspond to a single queue that is processed by a single CPU/core at the destination gateway for processing all of the packets for the tunnel.

Accordingly, one CPU of the destination gateway may become overloaded with packet processing across the VPN tunnel, while other CPUs of the destination gateway may remain underutilized. Having a large number of packets processed by a single CPU may also result in limiting the throughput of a corresponding VPN tunnel according to the processing capacity of the CPU. Additionally, conventional route-based VPNs may suffer from the lack of VPN tunnel redundancy since a pair of gateways uses only one VPN tunnel for all flows between endpoints of the pair of gateways. As such, if for some reason, the one VPN tunnel becomes nonoperational, the VPN traffic may not be communicated with the remote site.

SUMMARY

Herein described are one or more embodiments of a method for secure communication between a source machine executing in a first site and a destination machine executing in a second site. The method includes receiving, at the destination machine, first and second packets from the source machine through, respectively, first and second virtual private network (VPN) tunnels established between a first virtual tunnel interface (VTI) of the source machine and a second VTI of the destination machine. The first and second VPN tunnels are associated with first and second SAs, respectively. The method further includes determining that the first packet is associated with the firsts SA and the second packet is associated with the second SA. The method further includes, based on the determination, processing, by a first processing core of the destination machine, the first packet to decrypt the first packet based on the first SA, and processing, by a second processing core of the destination machine, the second packet to decrypt the second packet based on the second SA. The method further includes updating, at the second VTI, one or more states of one or more packet flows based on the first and second packets, the first and second VTIs each comprising a routable interface for routing network traffic between the source machine and the destination machine, the second VTI providing one or more stateful services for the one or more packet flows based on the one or more states.

Also described herein are embodiments of a non-transitory computer readable medium comprising instructions to be executed in a computer system, wherein the instructions, when executed in the computer system, cause the computer system to perform the method described above for secure communication between a source machine executing in a first site and a destination machine executing in a second site. For example, the instructions may include code or one or more instructions for performing each step of the method.

Also described herein are embodiments of a computer system, wherein software for the computer system is programmed to execute the method described above for secure communication between a source machine executing in a first site and a destination machine executing in a second site. For example, the computer system may include a processor coupled to a memory configured to perform each step of the method.

Also described herein are embodiments of a computer system comprising various means for executing the various steps of the method described above for secure communication between a source machine executing in a first site and a destination machine executing in a second site.

DETAILED DESCRIPTION

Figure 1:
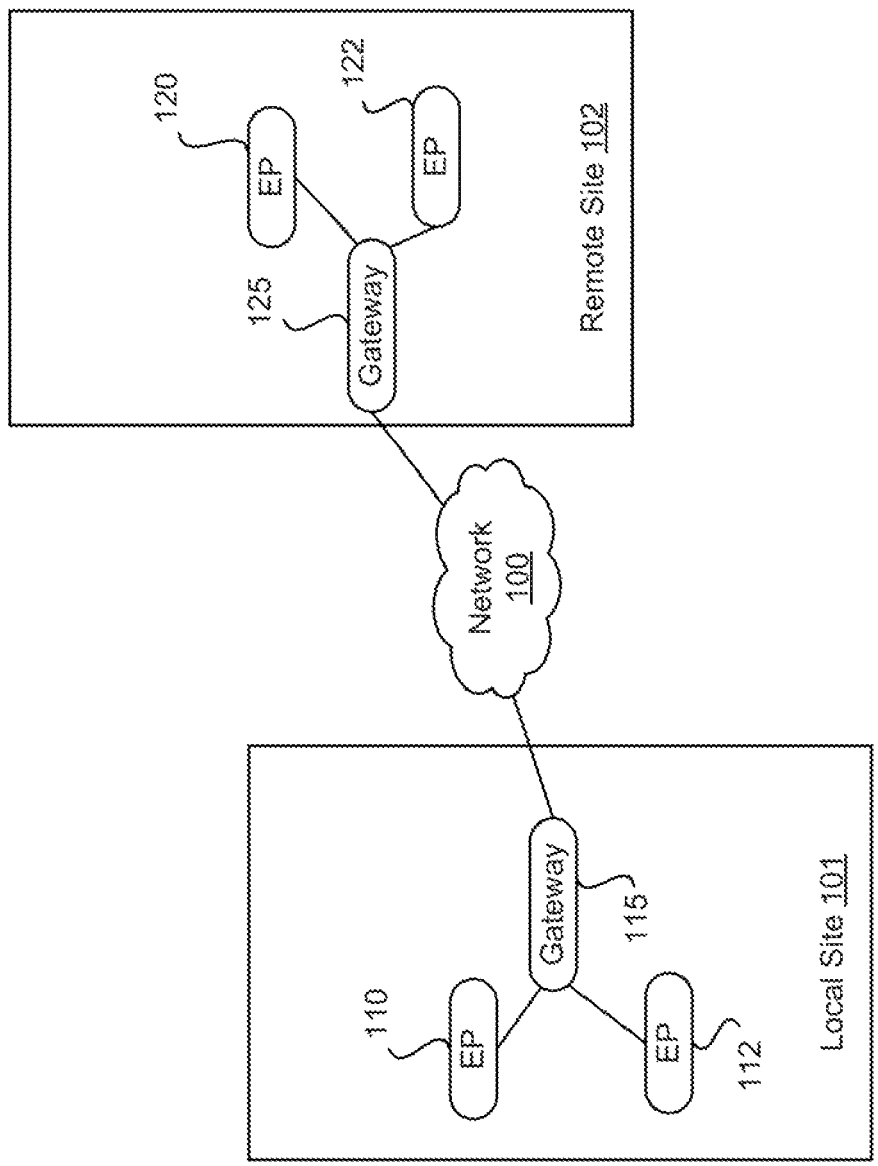
FIG. 1 is a block diagram illustrating endpoints within different sites communicating with each other through a network, according to an example embodiment of the present application.

As described above, since a route-based VPN typically uses a single SA for communication in one direction of a single VPN tunnel between source and destination gateways, the throughput of the VPN tunnel in any given direction may be limited to the processing capacity of a single CPU of the destination gateway for that direction. One solution to increasing VPN tunnel throughput in route-based VPNs is described in commonly owned U.S. patent application Ser. No. 16/514,647, entitled "USING VTI TEAMING TO ACHIEVE LOAD BALANCE AND REDUNDANCY," filed on Jul. 17, 2019, which is incorporated herein by reference in its entirety. As described in the aforementioned patent application, multiple virtual tunnel interfaces (VTIs) may be configured at the source gateway, where each VTI is associated with a different SA for encryption. A destination gateway is similarly configured with multiple corresponding VTIs, each associated with the same corresponding different SA for decryption. This way, the source and destination gateways implement multiple VPN tunnels, each of which corresponds to a different VTI, and each of which is associated with a different SA. Each SA has a different SPI value associated therewith, and accordingly, the tuples of header values of packets communicated across the different VPN tunnels will hash to different CPUs at the destination gateway for processing. However, this approach may lead to asymmetric routing of the flows which is particularly undesirable in cases where the gateways also provide stateful services at the VTIs.

Accordingly, some embodiments of the approach herein described provide a mechanism that is capable of scaling up the throughput in a route-based VPN (RBVPN) session between two gateways by distributing the processing of network traffic at the destination gateway among multiple processing cores of the destination gateway, while avoiding asymmetric routing, thereby avoiding disruption of the stateful services. In particular, techniques discussed herein include establishing a plurality of VPN tunnels between two gateways over a single pair of VTIs. Each VPN tunnel is associated with an SA and as such may also be referred to as an SA tunnel. Accordingly, at each gateway, a single VTI processes packets for the plurality of VPN tunnels, and therefore can maintain state for packets communicated across the plurality of VPN tunnels. Thus, asymmetric routing of flows of a session is avoided even when packets for the session are communicated across multiple VPN tunnels, allowing stateful services to operate properly. Further, since each VPN tunnel is associated with a different SA, load-balancing of packet processing for a session can be achieved at the destination gateway through the use of multiple VPN tunnels for communication of the packets. In some embodiments, the number of SAs in an SA bundle associated with a single VTI at a gateway may be defined statically, such as a fixed number (e.g., 2 SAs, 3 SAs, etc.). The number of SAs may alternatively be defined dynamically in some embodiments. For example, in some embodiments, an algorithm may determine, based on an overall ratio between the aggregate throughput and processing cores utilization being above or below a threshold, to expand on, or shrink the number of SAs in the SA bundle. In some such embodiments, as the states of the flows are maintained per VTI, the rehashing of the packet headers performed during such expansion or shrinkage of the SAs in the bundle may not impact the states of the flows.

It should be noted that while certain embodiments are described for communication between gateways, the techniques may similarly be applicable to communication between any suitable computing machines (e.g., VCIs, physical computing devices, etc.).

FIG. 1 is a block diagram illustrating two endpoints within two different sites communicating with each other through a network, according to an example embodiment of the present application. As shown in FIG. 1, network 100 connects gateway 115 within local site/datacenter 101 to gateway 125 within remote site/datacenter 102. A gateway may be a physical computing device or a VCI. Each of gateways 115 and 125 is configured with one or more secure protocols to secure network traffic exchanged between itself and a peer gateway.

Gateways 115 and 125 connect endpoints 110, 112, 120, and 122, for example, to stretch a network across geographically distant sites. An endpoint refers generally to an originating endpoint ("source endpoint") or a terminating endpoint ("destination endpoint") of a flow of network packets. In practice, an endpoint may be a physical computing device or a VCI.

As described above, gateways 115 and 125 may implement secure protocols, such as encapsulating security payload (ESP) tunnel mode, to secure communication between one another. Gateways 115 and 125 can thus apply a secure protocol to encrypt and encapsulate packets from a source endpoint, such as endpoint 110, and decrypt and decapsulate packets for a destination endpoint, such as endpoint 120, to securely transmit packets between endpoints over network 100.

For example, endpoint 110 generates and routes an IP packet to source gateway 115, the IP packet including a header with an IP address of endpoint 110 set as the source IP address and an IP address of endpoint 120 set as the destination IP address. The source gateway 115 receives the IP packet and encrypts it, including its header, based on an SA established between the source gateway 115 and the destination gateway 125. For example, gateway 115 encrypts the original IP packet with an encryption key associated with the SA. The source gateway 115 further encapsulates the encrypted packet by adding a new IP header and an ESP header including an SPI value corresponding to the SA to the encrypted packet to generate an encapsulated ESP encrypted data packet. The new IP header may include a source IP address of source gateway 115 and a destination IP address of destination gateway 125 so that the packet can be forwarded through network 100 from local/source datacenter 101 to remote/destination datacenter 102.

After receiving the packet from network 100, destination gateway 125 decapsulates and decrypt the encapsulated ESP encrypted data packet to extract the original IP packet. For example, destination gateway 125 identifies a corresponding SA for the packet that identifies a key for decrypting the encapsulated ESP encrypted data packet based on the SPI value included in the ESP header. Based on the destination IP address in the header of the original IP packet, gateway 125 then forwards the decrypted IP packet to destination endpoint 120. In some embodiments, a plurality of SAs are established by gateways 115 and 125 on behalf of endpoints 110, 112, 120, and 122.

Though certain embodiments are described herein with respect to the ESP protocol, other suitable secure protocols (e.g., authentication header (AH) protocol) alone or in combination with ESP, may be used in accordance with the embodiments described herein. Further, the embodiments described herein may similarly be used for different types of traffic such as IPv4, IPv6, etc.

Figure 2:
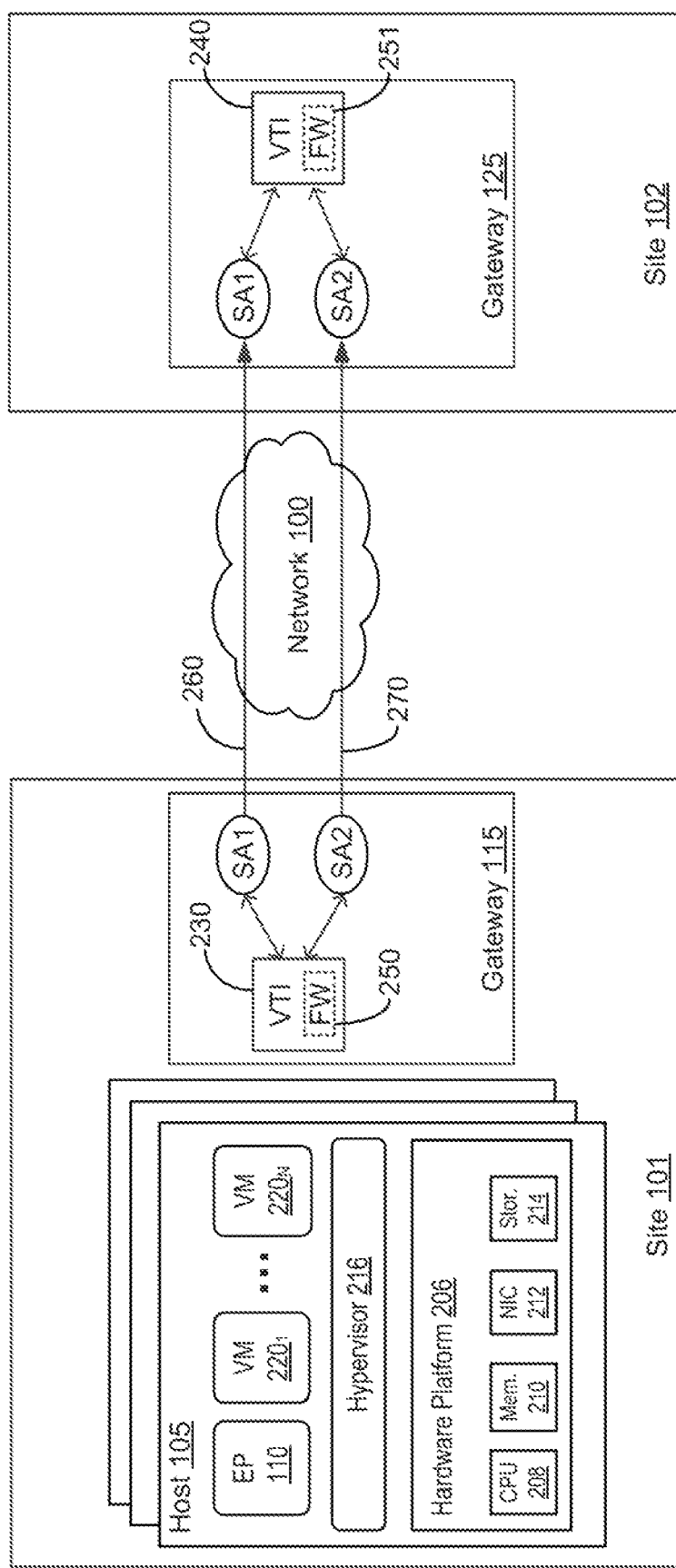
FIG. 2 is a block diagram illustrating the endpoints and gateways shown in FIG. 1 within their respective datacenters communicating secure traffic, according to an example embodiment of the present application.

FIG. 2 is a block diagram illustrating the endpoints and gateways shown in FIG. 1 within their respective sites/datacenters communicating secure traffic, according to an example embodiment of the present application.

Site 101 include host(s) 105. Site 101 may include additional components, such as a management and control cluster, a management network, a data network, a distributed data storage, etc., that are not shown in the figure for simplicity of description. The management and data networks may each provide Layer 2 or Layer 3 connectivity, for example, in accordance with the Open Systems Interconnection (OSI) model, with internal physical and/or software defined switches and routers (not shown in the figure). Hosts 105 may communicate with each other, with management and control clusters of site 101, or with other external network devices, such as gateway 125, via the management and data networks.

Each of hosts 105 may be constructed on a server grade hardware platform 206, such as an x86 architecture platform. For example, hosts 105 may be geographically co-located servers on the same rack. It should be noted that site 102 may also include multiple hosts and similar components as site 1, which are not shown in the figure for simplicity of description.

Hardware platform 206 of each host 105 includes components of a computing device, such as one or more central processing units (CPUs) 208, system memory 210, a network interface 212, storage system 214, and other I/O devices, such as, for example, USB interfaces (not shown). Network interface 212 enables host 105 to communicate with other devices via a communication medium. Network interface 212 may include one or more network adapters, which may also be referred to as network interface cards (NICs). Hosts 105 may be connected to each of the data network and management network via one or more NICs.

Host 105 may be configured to provide a virtualization layer, also referred to as a hypervisor 216, that abstracts processor, memory, storage, and networking resources of hardware platform 206 into multiple virtual machines 220₁ to 220_N (collectively referred to as VMs 220 and individually referred to as VM 220) that run concurrently on the same host. In FIG. 2, endpoint 110 is shown as a VM running on host 105. It should be noted that endpoint 110 may instead be a physical computing device (not shown). Hypervisor 216 may run on top of the operating system in host 105. In some embodiments, hypervisor 216 can be installed as system level software directly on hardware platform 206 of host 105 (often referred to as "bare metal" installation) and be conceptually interposed between the physical hardware and the guest operating systems executing in the virtual machines.

In some implementations, hypervisor 216 may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine. Although the disclosure is described with reference to VMs, the teachings herein also apply to other types of VCIs.

Gateway 115 may manage external public IP addresses for VMs 220 and route traffic incoming to and outgoing from site 101 and provide networking services, such as firewalls, network address translation (NAT), dynamic host configuration protocol (DHCP), and load balancing. As discussed, some such services may be stateful services. Gateway 115 uses the data network to transmit data network packets to hosts 105 or receive data packets from hosts 105. Gateway 125 provides a similar function for site 102 as gateway 115 provides for site 101.

Gateways 115 and 125 securely communicate with each other through a plurality of VPN tunnels, including tunnels 260 and 270, such as using RBVPN. For ease of illustration and discussion, communication is shown and described in only one of the two directions, with gateway 115 as the source gateway and gateway 125 as the destination gateway. Accordingly, the SAs shown are only for communication in the one direction across tunnels 260 and 270, and corresponding SAs for communication in the other direction are not shown.

Gateway 115 includes a VTI 230, and gateway 125 includes a VTI 240. As shown a plurality of VPN tunnels, including tunnels 260 and 270, are associated with each of VTIs 230 and 240, each of the VPN tunnels associated with a different SA. In particular, tunnel 260 is associated with SA1 and tunnel 270 is associated with SA2. VTIs 230 and 240 may be referred to as a pair of VTIs as they are used for communication between each other. As described further herein with respect to FIGS. 4-6, gateways 115 and 125 can use the pair of VTIs 230 to communicate packets for a session across multiple tunnels, including tunnels 260 and 270, to achieve load-balancing of packet processing at each gateway based on the use of multiple SAs, while still allowing stateful services to operate properly. In particular, since the packets, regardless of whether they are communicated over tunnel 260 or 270, are communicated via only one VTI at each gateway, the one VTI can apply stateful services across all of the tunnels. In particular, a VTI may implement one or more stateful services. In the example shown in FIG. 2, VTI 230 is associated with firewall service 250, while VTI 240 is associated with firewall service 251.

Figure 3:
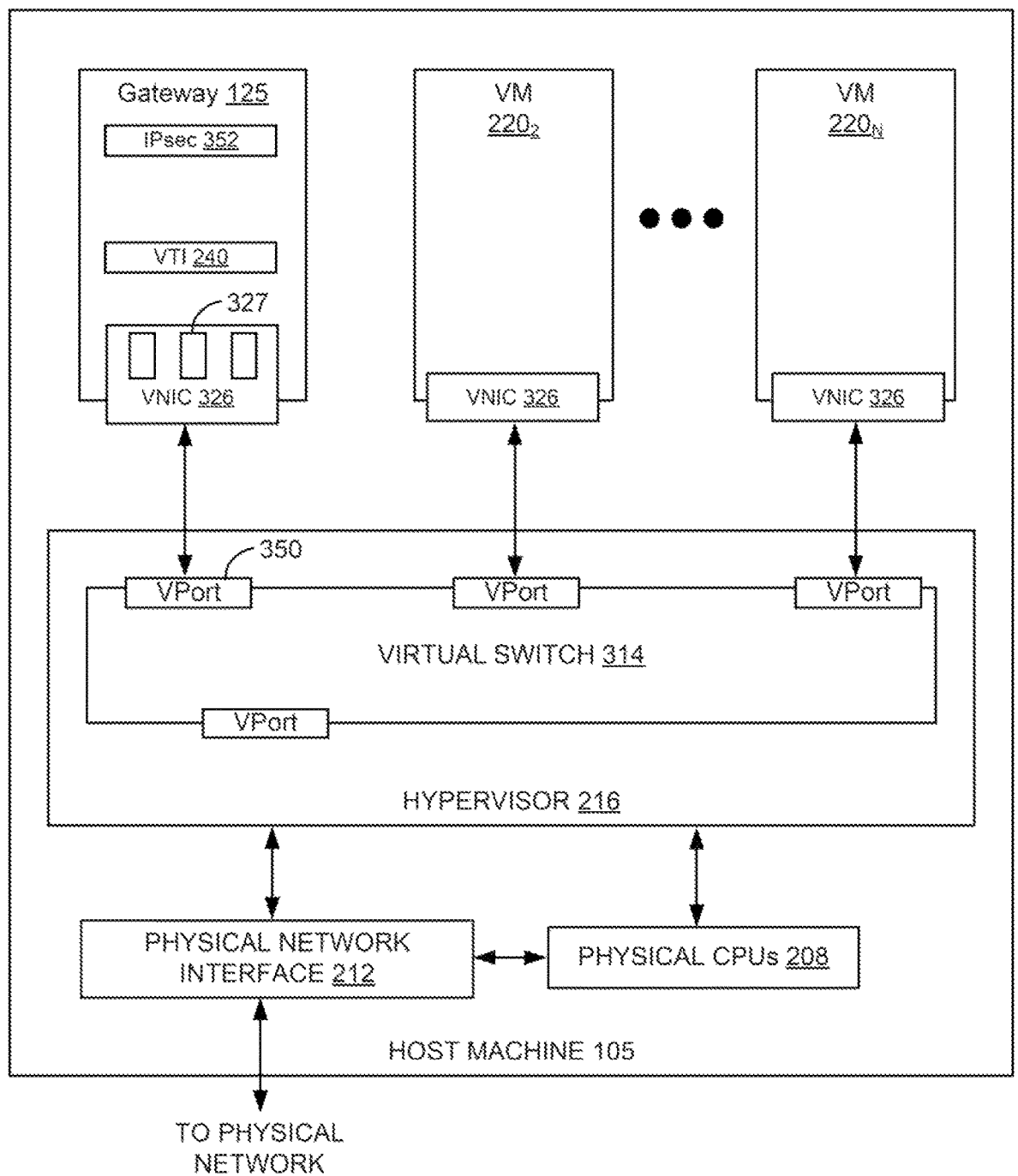
FIG. 3 is a block diagram illustrating different components within a host machine of a datacenter for processing and routing network traffic through multiple VPN tunnels, according to an example embodiment of the present application.

FIG. 3 is a block diagram illustrating additional components within host machine 105 for processing and routing network traffic through one or more VPN tunnels, according to an example embodiment of the present application.

Hypervisor 216 serves as an interface between virtual machines 220 and PNIC 212, as well as other physical resources (including physical CPUs 208) available on host machine 105. Each VM 220 is shown including a virtual network interface card (VNIC) 326, which is responsible for exchanging packets between VM 220 and hypervisor 216. Though shown as included in VMs 220, it should be understood that VNICs 326 may be implemented by code, such as VM monitor (VMM) code, associated with hypervisor 216. VMM code is part of host code that is provided as part of hypervisor 216, meaning that a VNIC 326 may not be executed by VM 220's code, also referred to as guest code. VNICs 326 may be, in some cases, a software implementation of a physical network interface card. Each VM 220 may be connected to a virtual port (vport) 350 provided by virtual switch 314 through the VM's associated VNIC 326. Virtual switch 314 may serve as a physical network switch, e.g., that serves as an edge device on the physical network, but implemented in software. Virtual switch 314 may be connected to PNIC 212 to allow network traffic to be exchanged between VMs 220 executing on host machine 105 and destinations on an external physical network.

In certain embodiments, each VNIC 326 is configured to perform receive-side scaling (RSS). Accordingly, each VNIC 326 is associated with a plurality of software based VNIC RSS queues 327 on VM 220. Each of the VNIC RSS queues 327 represents a memory space and may be associated with a different one virtual CPU/processing core of a plurality of virtual CPU cores. A virtual CPU core, in some embodiments, corresponds to different resources (e.g., physical CPU or execution core, time slots, compute cycles, etc.) of one or more physical CPUs 208 of host machine 105. When receiving incoming packets, VNIC 326 computes a hash value based on header attributes of the incoming packets and distributes the incoming packets among the VNIC RSS queues 327 associated with VNIC 326. In particular, different hash values are mapped to different VNIC RSS queues 327. Each virtual CPU core of VM 220 may be responsible for accessing incoming packets stored in one RSS queue 327 and performing one or more operations on the packet, such as forwarding, routing, etc.

Accordingly, using RSS, the processing of packets may be distributed to different virtual CPUs at the VNIC 326 at the beginning of the processing pipeline for the packets, therefore taking advantage of distributed processing of packets at an early stage in the processing pipeline.

Gateway 125 is shown as a VM in FIG. 3. Gateway 125 is configured to implement secure protocols and functionality using IPSec component 352 ("IPSec 352"). More specifically, IPSec 352 encrypts outgoing packets destined for a destination gateway based on a corresponding SA and encapsulates them with headers. In each packets' header, IPSec 352 may include an SPI value associated with the SA. IPSec 352 is also configured to decrypt incoming encapsulated IPSec encrypted data packets received from a source gateway.

In an example, a VM 220 executing on host machine 105, or on another host, may be a destination endpoint for a packet, such as VM 220₂. A source endpoint in a different datacenter may generate an IP packet to send to VM 220₂. The source endpoint may forward the IP packet to a source gateway, which encrypts the packet using a secure protocol and sends the encrypted packet to destination gateway 125. The encrypted packet is received at virtual switch 314 of host machine 105 via PNIC 212. Virtual switch 314 sends the encrypted packet to VNIC 326 of gateway 125.

VNIC 326 uses the SPI value in the encrypted packets to hash the encrypted packets to different RSS queues 327. In certain embodiments, in addition to the use of the SPI value for hashing, one or more of the source IP address, destination IP address, source port number, destination port number, or protocol number may be used for performing the hash.

As discussed further herein, in an example, VTI 230 can select different SAs from a bundle of SAs for communicating different packets of a session, such that the packets are processed and routed to gateway 125 through multiple VPN tunnels. As discussed, at VNIC 326 of gateway 125, the packets may be hashed to different RSS queues 327 and processed by different cores based on the use of different SAs having different SPI values, thereby achieving load balancing. Further, even though multiple VPN tunnels are established between the source gateway 115 and destination gateway 125, since all the VPN tunnels are processed by a single pair of VTIs 230 and 240, irrespective of on which RSS queue, and by what processing core, each packet of the session is processed, all the state information with respect to the packets is available at VTIs 230 and 240. Accordingly, the network traffic may stay symmetric and therefore the problems associated with application of stateful services may be avoided.

Figure 4:
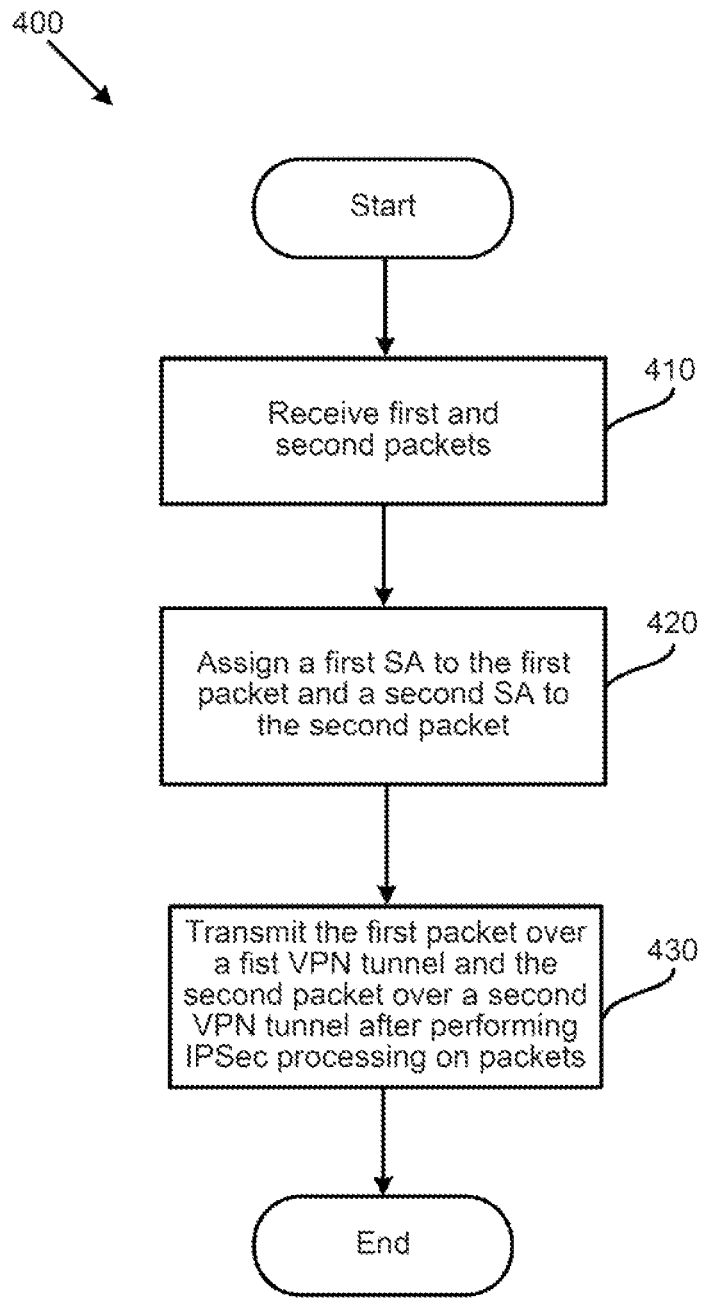
FIG. 4 is a flowchart illustrating a method or process for an egress VTI to assign different SAs to different packets for secure communication, according to an example embodiment of the present application.

FIG. 4 is a flowchart illustrating a method or process 400 for an egress VTI to assign different SAs to different packets for secure communication, according to an example embodiment of the present application. In some embodiments, process 400 may be performed by an egress VTI of a source gateway, such as source gateway 115.

Process 400 begins by gateway 115 receiving, at 410, first and second packets to be transmitted to gateway 125. The first and second packets can be received from the same or different endpoints. Further, the first and second packets may belong to the same or different flows, even when from the same endpoint. In certain embodiments, the first and second packets may be processed by the same processing core at gateway 115, such as if they are part of the same flow and hash to the same RSS queue or may be processed by different processing cores at gateway 115, such as if they are part of different flows and hash to different RSS queues when received. The processing of the first and second packets includes SA assignment and encryption.

At 420, gateway 115 assigns a first SA from a bundle of SAs to the first packet and a second SA from the bundle of SAs to the second packet. In particular, as shown in FIG. 2, gateway 115 in site 101 may receive the first and second packets. After receiving the first and second packets, VTI 230 within gateway 115 may select SA1 from an SA bundle for processing the first packet. Conversely, VTI 230 may select SA2 from the SA bundle for processing the second packet. As discussed, by using different SAs, the packets may be load balanced to different processing cores at gateway 125. Accordingly, the processing core processing the first packet encrypts the first packet based on an encryption key indicated by the first SA and a processing core processing the second packet encrypts the second packet based on another encryption key indicated by the second SA. Process 400, in some embodiments, may assign the first SA to the first packet and the second SA to the second packet based on any suitable load balancing mechanism, such as round-robin, a hashing mechanism, such as hashing the 5-tuple in the packet header, or the like. As described above, in certain embodiments, when the first and second packets belong to the same flow, they may be assigned the same SA, such that they will be routed to the destination endpoint through the same VPN tunnel.

Continuing, gateway 115 transmits, at 430, the first and second packets through first and second VPN tunnels 260 and 270, respectively, to destination gateway 125. The process may then end. It should be noted that in some embodiments, the process may check to see if any of the VPN tunnels is down (or dead). In some such embodiments, if a tunnels is down, the process may remove the SA that is associated with the failed tunnel from the bundle of SAs. In some embodiments, the process may leverage a dead peer detection (DPD) method to check on the aliveness of the VPN tunnels. In some embodiments, when the process determines that a dead VPN tunnel connection is back alive, the process may return its corresponding SA to the SA bundle.

The specific operations of process 400 may not be performed in the exact order shown and described. Additionally, the specific operations may not be performed in one continuous series of operations, and different specific operations may be performed in different embodiments. For example, in some embodiments, process 400 may, before the processing and transmitting the packets on the first and second VPN tunnels, at 430, or even before selecting the first and second SAs for processing the first and second packets, at 420, perform one or more stateful services, such as enforce one or more firewall rules on the first and second packets based on a particular firewall service associated with the VPN in the source gateway. As part of performing stateful services, the VTI 230 may update state tables for one or more packet flows corresponding to the packets. The state table may include forwarding data associated with the one or more packet flows.

Figure 5:
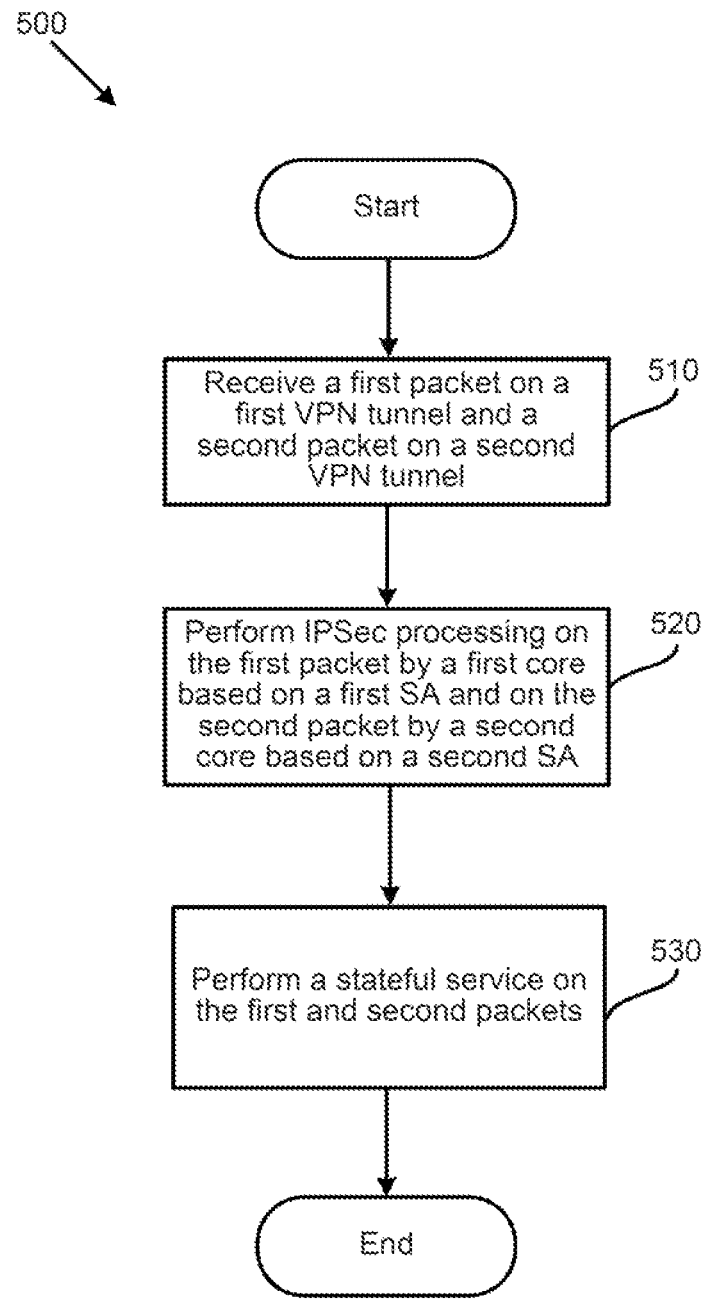
FIG. 5 is a flowchart illustrating a method or process for a destination gateway to assign different packets received on different VPN tunnels established between a source gateway and a destination gateway to different processing cores, according to an example embodiment of the present application.

FIG. 5 is a flowchart illustrating a method or process 500 for a destination gateway to assign different packets received on different VPN tunnels to different processing cores for processing, according to an example embodiment of the present application. In some embodiments, process 500 may be performed by a destination gateway, such as destination gateway 125.

Process 500 begins by gateway 125 receiving, at 510, the first packet on the first VPN tunnel 260 and the second packet on the second VPN tunnel 270 as transmitted by gateway 115 according to process 400.

The first and second packets may be received at a NIC (e.g., PNIC or VNIC) of the gateway 125. In certain embodiments, the first and second packets are processed by different processing cores at gateway 125. In particular, the first and second packets have different SPI values and therefore may hash to different RSS queues when received. The processing of the first and second packets may include decryption of the packets.

After determining that the first packet is assigned the first SA and the second packet is assigned the second SA, for example, from the respective SPI values in the packet headers, gateway 125 processes, at 520, the first packet by a first processing core to decrypt the first packet using an encryption key that is indicated by the first SA. Process 500 also processes the second packet by a second processing core to decrypt the second packet using an encryption key that is indicated by the second SA. In certain embodiments, the second processing core may be the same as the first processing core (e.g., depending on the RSS logic in the NIC, the header information used for hashing, etc.). For example, different SPIs may hash to the same processing core. In certain embodiments, however, the first and second processing cores may preferably be two different processing cores.

After decrypting the first and second packets, process 500 may perform, at 530, a stateful service operation on the first and second packets. The stateful service may be associated with a VTI of the destination gateway. As part of performing stateful services, the VTI 230 may update state tables for one or more packet flows corresponding to the packets. The state table may include forwarding data associated with the one or more packet flows. The stateful services may use the updated state tables for processing subsequent packets. For example, after the first and second packets are received by VTI 240, firewall 251 may perform firewall service operations on the first and second packets. After the firewall rules are enforced on the first and second packets, the packets may be transmitted by VTI 240 to their final destination (e.g., a destination endpoint). The process may then end.

Based on processes 400 and 500, packets for a single session sent on different tunnels may still be processed by the same VTI at a gateway, thereby allowing stateful services to properly function. In an example, the session includes a first flow with endpoint 110 as the source and endpoint 120 as the destination. Further, the session includes a second flow with endpoint 120 as the source and endpoint 110 as the destination. VTI 230 of gateway 115 sends packets of the first flow to VTI 240 of gateway 125 over tunnel 260, and updates state tables at VTI 230 for the session based on the packets of the first flow. Further, VTI 240 sends packets of the second flow to VTI 230 over tunnel 270. Even though the packets of the second flow are received by VTI 230 over a different tunnel 270 as compared to tunnel 260 used by VTI 230 to transmit packets of the first flow, VTI 230 still receives the packets of the second flow and updates state tables for the session based on the packets of the second. Accordingly, asymmetric routing is avoided.

Figure 6:
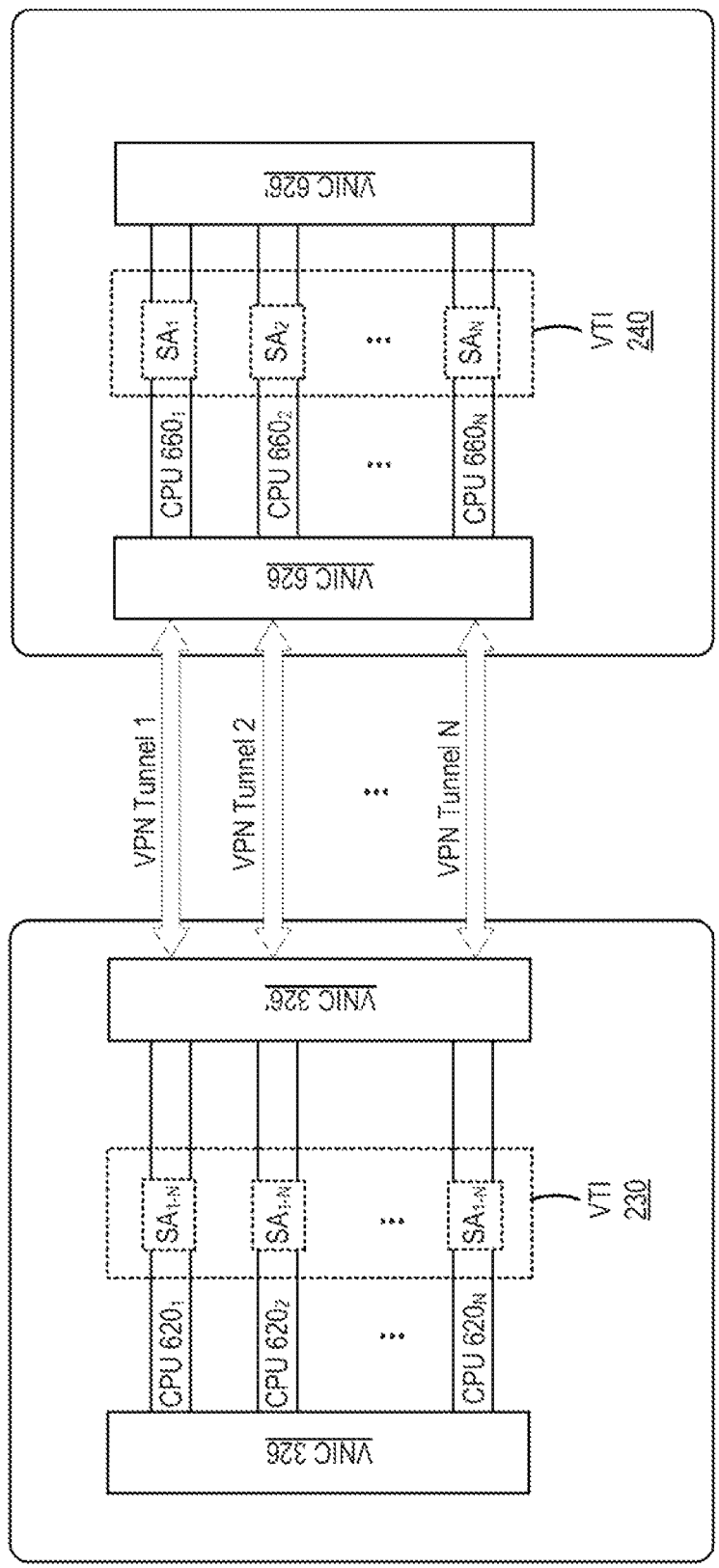
FIG. 6 is a block diagram illustrating a pair of egress and ingress VTIs communicating with each other through multiple VPN tunnels, according to an example embodiment of the present application.

FIG. 6 is a block diagram illustrating a pair of egress and ingress VTIs communicating with each other through multiple VPN tunnels, according to an example embodiment of the present application. As shown in the figure, VTI 230 is spread across multiple processing pipelines between an ingress VNIC 326 and an egress VNIC 326' of a source gateway. In some embodiments, the ingress and egress VNICs 326 and 326' are the same VNIC, while in other embodiments, these VNICs are separate VNICs. Each of the pipelines corresponds to an RSS queue that is processed by a processing core, such as CPU core $620_1$, CPU core $620_2$, etc. Additionally, VTI 230 may select any SAs from $SA_1$ to $SA_N$ on each pipeline for processing the packets distributed on that pipeline in some embodiments. In some embodiments, each of the pipelines is associated with a different subset of one or more (e.g., less than all) of the SAs from $SA_1$ to $SA_N$, and therefore only certain SA(s) may be available on a given pipeline.

Similar to VTI 230, VTI 240 is spread across multiple processing pipelines between an ingress VNIC 626 and an egress VNIC 626' of a destination gateway. In some embodiments, the ingress and egress VNICs 626 and 626' are the same VNIC, while in other embodiments, these VNICs are separate VNICs. Each of the pipelines corresponds to an RSS queue that is processed by a processing core, such as CPU core $660_1$, CPU core $660_2$, etc. As shown, in one embodiment, there are an equal number of RSS queues as there are SAs, and accordingly, packets for each SA are processed by a corresponding core. In some embodiments, there may be fewer or a greater number of RSS queues as compared to SAs, and packets for multiple SAs may be processed by a given core. For example, packets that are distributed to the first pipeline, such as packets encrypted using $SA_1$, may be processed, for example, by CPU core $660_1$. Similarly, packets that are distributed to the second pipeline, such as packets encrypted using $SA_2$, may be processed, for example, by CPU core $660_2$.

Also, as shown in the figure, egress VNIC 326' is coupled to ingress VNIC 626 through multiple VPN tunnels. Each VPN tunnel may be associated with a different SA.

In an example, when first and second packets (e.g., of a flow) are received by ingress VNIC 326, the VNIC may assign the first and second packets, for example based on their respective 5-tuples, to the first forwarding processing pipeline that is processed by CPU core $620_1$. Thereafter, the packets are received by VTI 230 which may assign $SA_1$ to the first packet and $SA_2$ to the second packet for processing. After the plain text packets are encrypted, encrypted first and second packets are received by egress VNIC 326'. Egress VNIC 326' transmits the packets to a destination gateway according to the SAs based on which the packets are processed. For example, egress VNIC 326' may transmit the first packet to the destination gateway through VPN tunnel 1 and transmit the second packet to the destination gateway through VPN tunnel 2.

Ingress VNIC 626 receives the encrypted first and second packets from their respective tunnels. Based on the SPI values in the packet headers, ingress VNIC 626 may distribute the first packet received from VPN tunnel 1 to the first pipeline to be processed by CPU core $660_1$ and distribute the second packet received from VPN tunnel 2 to the second pipeline to be processed by CPU core $660_2$. After CPU core $660_1$ processes the first packet and CPU core $660_2$ processes the second packet, VTI 240 send the decrypteds (or plain text) packets to egress VNIC 626' to transmit the first and second packets to their final destination based on the destination IP address (and port number) indicated in the packet headers.

In host machine 105, with reference to FIGS. 2 and 3, processing unit(s) may retrieve instructions to execute and data to process in order to execute the processes discussed herein. The processing unit(s) may be a single processor or a multi-core processor in different embodiments. The read-only-memory (ROM) may store static data and instructions that may be utilized by the processing unit(s) and other modules of the electronic system. The permanent storage device, on the other hand, may be a read-and-write memory device. The permanent storage device may be a non-volatile memory unit that stores instructions and data even when the host machine is off. Some embodiments use a mass-storage device (such as a magnetic or optical disk and its corresponding disk drive) as the permanent storage device.

Some embodiments use a removable storage device (such as a flash drive, etc.) as the permanent storage device. Like permanent storage device, the system memory may be a read-and-write memory device. However, unlike permanent storage device, the system memory may be a volatile read-and-write memory, such as a random access memory (RAM). The system memory may store some of the instructions and data that processing unit(s) utilize at runtime. In some embodiments, processes discussed herein are stored in the system memory, the permanent storage device, and/or the read-only memory.

Certain embodiments as described above involve a hardware abstraction layer on top of a host computer. The hardware abstraction layer allows multiple contexts or virtual computing instances to share the hardware resource. In some embodiments, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs.

It should be noted that these embodiments may also apply to other examples of virtual computing instances, such as containers not including a guest operating system, referred to herein as "OS-less containers". OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for secure communication between a source machine executing in a first site and a destination machine executing in a second site, comprising:

receiving, at the destination machine, first and second packets from the source machine through, respectively, first and second virtual private network (VPN) tunnels established between a first virtual tunnel interface (VTI) of the source machine and a second VTI of the destination machine, the first and second packets associated with a first packet flow of a first session;

determining that the first packet is associated with a first security association (SA) and the second packet is associated with a second SA;

based on the determination, processing, by a first processing core of the destination machine, the first packet to decrypt the first packet based on the first SA;

based on the determination, processing, by a second processing core of the destination machine, the second packet to decrypt the second packet based on the second SA;

transmitting, by the second VTI, a third packet on a third VPN tunnel to the source machine, the third packet associated with a second packet flow initiated by the destination endpoint in response to receiving the first flow, the second packet flow being associated with the first session; and updating, at the second VTI, one or more state tables for the first session, based on the first, second, and third packets, the first and second VTIs each comprising a routable interface for routing network traffic between the source machine and the destination machine, the second VTI providing one or more stateful services for the first and second packet flows based on the one or more state tables.

2. The method of claim 1, wherein the first VTI:

receives the first and second packets from at least one source endpoint;

assigns the first SA to the first packet, such that after processing the first packet to encrypt the first packet based on the first SA, the first packet is transmitted to the destination machine via the first VPN tunnel; and assigns the second SA to the second packet, such that after processing the second packet to encrypt the second packet based on the second SA, the second packet is transmitted to the destination machine via the second VPN tunnel.

3. The method of claim 2, wherein the first VTI receives the first and second packets on a receive-side scaling (RSS) queue of the source machine, wherein the RSS queue is associated with a processing core of the source machine.

4. The method of claim 1, wherein the first and second VPN tunnels are associated with a single session between the source and destination machines.

5. The method of claim 1, wherein the destination machine comprises a plurality of VTIs, the plurality of VTIs comprising the second VTI.

6. The method of claim 1, wherein the one or more stateful services comprises a firewall.

7. The method of claim 1, wherein the source and destination machines are gateways located, respectively, at edges of networks of the first and second sites.

8. The method of claim 1, wherein updating one or more states of the one or more packet flows comprises updating one or more state tables that include forwarding data associated with the one or more packet flows.

9. A non-transitory computer readable medium comprising instructions that, when executed by one or more processors of a computing system, cause the computing system to perform a method for secure communication between a source machine executing in a first site and a destination machine executing in a second site, the method comprising:

receiving, at the destination machine, first and second packets from the source machine through, respectively, first and second virtual private network (VPN) tunnels established between a first virtual tunnel interface (VTI) of the source machine and a second VTI of the destination machine, the first and second packets associated with a first packet flow of a session;

determining that the first packet is associated with a first security association (SA) and the second packet is associated with a second SA;

based on the determination, processing, by a first processing core of the destination machine, the first packet to decrypt the first packet based on the first SA;

based on the determination, processing, by a second processing core of the destination machine, the second packet to decrypt the second packet based on the second SA;

transmitting, by the second VTI, a third packet on a third VPN tunnel to the source machine, the third packet associated with a second packet flow initiated by the destination endpoint in response to receiving the first flow, the second flow being associated with the first session; and updating, at the second VTI, one or more state tables for the first session based on the first, second, and third packets, the first and second VTIs each comprising a routable interface for routing network traffic between the source machine and the destination machine, the second VTI providing one or more stateful services for the first and second packet flows based on the one or more state tables.

10. The non-transitory computer readable medium of claim 9, wherein the first VTI:

receives the first and second packets from at least one source endpoint;

assigns the first SA to the first packet, such that after processing the first packet to encrypt the first packet based on the first SA, the first packet is transmitted to the destination machine via the first VPN tunnel; and assigns the second SA to the second packet, such that after processing the second packet to encrypt the second packet based on the second SA, the second packet is transmitted to the destination machine via the second VPN tunnel.

11. The non-transitory computer readable medium of claim 10, wherein the first VTI receives the first and second packets on a receive-side scaling (RSS) queue of the source machine, wherein the RSS queue is associated with a processing core of the source machine.

12. The non-transitory computer readable medium of claim 9, wherein the first and second VPN tunnels are associated with a single session between the source and destination machines.

13. The non-transitory computer readable medium of claim 9, wherein the destination machine comprises a plurality of VTIs, the plurality of VTIs comprising the second VTI.

14. The non-transitory computer readable medium of claim 9, wherein the one or more stateful services comprises a firewall.

15. The non-transitory computer readable medium of claim 9, wherein the source and destination machines are gateways located, respectively, at edges of networks of the first and second sites.

16. A computer system, comprising:

a memory; and a processor coupled to the memory, the processor being configured to:

receive, at the destination machine, first and second packets from the source machine through, respectively, first and second virtual private network (VPN) tunnels established between a first virtual tunnel interface (VTI) of the source machine and a second VTI of the destination machine, the first and second packets associated with a first packet flow of a first session;

determine that the first packet is associated with a first security association (SA) and the second packet is associated with a second SA;

based on the determination, process, by a first processing core of the destination machine, the first packet to decrypt the first packet based on the first SA;

based on the determination, process, by a second processing core of the destination machine, the second packet to decrypt the second packet based on the second SA;

transmit, by the second VTI, a third packet on a third VPN tunnel to the source machine, the third packet associated with a second packet flow initiated by the destination endpoint in response to receiving the first flow, the second packet flow being associated with the first session; and update, at the second VTI, one or more state tables for the first session based on the first, second, and third packets, the first and second VTIs each comprising a routable interface for routing network traffic between the source machine and the destination machine, the second VTI providing one or more stateful services for the first and second packet flows based on the one or more state tables.

17. The computer system of claim 16, wherein the first VTI:

receives the first and second packets from at least one source endpoint;

assigns the first SA to the first packet, such that after processing the first packet to encrypt the first packet based on the first SA, the first packet is transmitted to the destination machine via the first VPN tunnel; and assigns the second SA to the second packet, such that after processing the second packet to encrypt the second packet based on the second SA, the second packet is transmitted to the destination machine via the second VPN tunnel.

18. The computer system of claim 17, wherein the first VTI receives the first and second packets on a receive-side scaling (RSS) queue of the source machine, wherein the RSS queue is associated with a processing core of the source machine.

19. The computer system of claim 16, wherein the first and second VPN tunnels are associated with a single session between the source and destination machines.

20. The computer system of claim 16, wherein the destination machine comprises a plurality of VTIs, the plurality of VTIs comprising the second VTI.

* * * * *